UNITED STATES PATENT OFFICE.

GUSTAV A. MÜLLER, OF CHICAGO, ILLINOIS.

IMPROVEMENT IN THE MANUFACTURE OF ISINGLASS.

Specification forming part of Letters Patent No. 148,317, dated March 10, 1874; application filed February 14, 1874.

*To all whom it may concern:*

Be it known that I, GUSTAV A. MÜLLER, of Chicago, in the county of Cook and State of Illinois, have invented a new and Improved Process for Making Isinglass from the airbladder of the sturgeon, of which the following is a specification:

This invention relates to the manufacture of the so-well-known isinglass, a gelatine used as a paste, and for clarifying wine and beer; and has for its object to furnish an article equal, if not better, than the renowned Russian product.

To prepare the isinglass, I take the air-bladder of the sturgeon, and cut the same open lengthwise by means of a pair of scissors, and spread the same on a board, with the outside skin downward, and remove the slimy matter contained in the bladder by means of scraping and washing with clean water, after which I spread the bladder upon another dry and clean board, with the inside downward, and let it dry sufficiently until the outside skin can be removed, thus leaving the gelatine only upon the inside fine skin, which, however, yet contains blood and other impurities to be removed by inserting the bladder, after spreading the same upon a piece of slate, into a solution of one-half pound of saltpeter in thirty pounds of water, and leave it therein for twelve hours. Now I remove the bladder, and insert the same in pure water, where it is to remain for about two hours, after which any slime adhering thereto yet is removed, and all dirty or colored parts are cut off; after which the bladder is placed between two soft wooden boards, and put under pressure for three-quarters of an hour, when the same is carefully removed from between the boards, and exposed to the fumes of sulphur for about an hour, and now dried in the air and ready for use.

Raw bladders may be preserved by salting, when, before using the same for the manufacture of isinglass, they require to be inserted in pure water long enough until all the salt has been extracted.

Having thus described my invention, what I claim, and desire to secure by Letters Patent, is—

The process of manufacturing isinglass from the air-bladder of the sturgeon, by inserting the same into a solution of saltpeter for better cleaning, and exposing it afterward to the fumes of burning sulphur.

GUSTAV A. MÜLLER.

Witnesses:
WM. H. LOTZ,
H. P. BISCHOFF.